(No Model.)

C. A. EVARTS.
CENTRAL DRAFT LAMP.

No. 432,264. Patented July 15, 1890.

UNITED STATES PATENT OFFICE.

CHARLES A. EVARTS, OF MERIDEN, CONNECTICUT, ASSIGNOR TO THE BRADLEY & HUBBARD MANUFACTURING COMPANY, OF SAME PLACE.

CENTRAL-DRAFT LAMP.

SPECIFICATION forming part of Letters Patent No. 432,264, dated July 15, 1890.

Application filed December 30, 1889. Serial No. 335,351. (No model.)

*To all whom it may concern:*

Be it known that I, CHARLES A. EVARTS, of Meriden, in the county of New Haven and State of Connecticut, have invented a new Improvement in Wick-Adjusters for Central-Draft Lamps; and I do hereby declare the following, when taken in connection with accompanying drawings, and the letters of reference marked thereon, to be a full, clear, and exact description of the same, and which said drawings constitute part of this specification, and represent, in—

Figure 1:
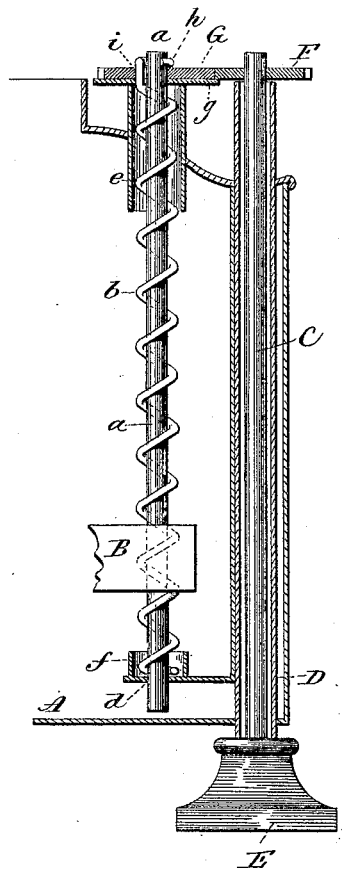
Figure 2:
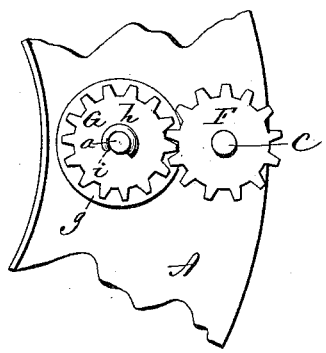

Figure 1, a vertical central section of the fount, showing a side view of the wick-adjusting shaft and its operating-shaft; Fig. 2, a top view of the same.

This invention relates to an improvement in that class of wick-adjusters for central-draft lamps in which the wick-adjuster is operated by a vertical endless screw supported in the fount, and so that by the rotation of the said screw the wick-adjuster will be raised or lowered, according to the direction in which the screw is turned, the invention being particularly adapted to those adjusters of this class in which a vertical shaft is arranged through the fount parallel with the screw, the shaft extending through the fount and provided with a knob below, by which it may be rotated, the shaft and the screw geared together above the fount; and the invention consists in the construction as hereinafter described, and particularly recited in the claims.

A represents the fount, which is of usual construction, not necessary to be shown in detail. The vertical endless screw is composed of a shaft *a*, with a wire thread *b* coiled around it and made fast to the shaft, so as to revolve with it, that the said spiral wire may serve as a screw-thread, and which, working in the nut portion B of the wick-adjuster, will cause that adjuster to rise or fall, according to the direction in which the screw is turned. The screw is supported in a suitable bearing *d* at the lower end and in a bearing *e* at the upper end. As here represented this upper bearing is a tube made fast in the top of the fount and of an internal diameter corresponding to the internal diameter of the screw-thread, and so that the screw-thread will take a bearing therein, and so as to support the shaft in its proper position. In this class of lamps there will unavoidably be more or less fiber escape from the wick and settle at the bottom of the fount. Owing to this collection in the bottom of the fount, a difficulty is experienced in this class of adjusters from the fact that the termination of the thread above the bottom of the fount and unprotected catches such sediment, and in the rotation of the screw will cause it to work up on the thread of the screw and to clog the nut to a greater or less extent. In many cases this is a serious difficulty. To overcome this difficulty, I inclose the lower end of the screw-thread by a cup-shaped collar *f*, this collar being arranged above the bottom of the fount and on the bearing in which the shaft is supported. It so incloses the lower end of the thread as to prevent the possibility of its engaging the sediment which may lie upon or near the bottom of the fount.

C represents the operating-shaft. It is arranged through a tube D, which extends vertically from the top to the bottom of the fount and open both at the top and bottom. Upon the lower end of the shaft C a suitable head E is arranged by which the shaft C may be rotated. At its upper end the shaft C carries a gear F, which works into a corresponding gear G on the screw-shaft and so that the rotation of the shaft C will impart corresponding rotation to the adjusting-screw. The collar *g* rests upon the top of the tubular bearing *e* so as to support the screw against downward movement. To support it against upward movement, a collar *g* is arranged beneath the gear G on the screw-shaft, and of somewhat larger diameter than the gear, or so as to extend beneath the gear F of the shaft C, as seen in Fig. 1, and so that this collar will take a bearing upon the under side of the gear F, and thereby prevent the rising of the screw-shaft. The operating-shaft being supported, as shown, against either up or down movement, it follows that the screw-shaft is also prevented from vertical movement.

For the purpose of assembling the parts, the head E is removable from the shaft C, and when so removed the shaft C may be drawn upward from the fount, and then the adjusting-screw is free to be drawn from the fount in like manner.

To secure the gear G to the screw-shaft, as well as to secure the spiral wire thread to the shaft, and so as to prevent the rotation of the screw-shaft independent of the screw-thread, the wire of the thread at its upper end is turned laterally around the screw-shaft, as seen at *h*, and so as to form a collar around the shaft and, as seen in Fig. 2, this collar portion of the wire thread may be closed so firmly around the shaft as to secure the wire to its shaft; but I prefer to add solder between the shaft and this collar portion of the wire, it being understood that the screw-thread portion of the wire is simply coiled around the shaft and requires no other attachment to the shaft than that given by closing the wire around the upper portion of the shaft, as described. The wire thread also serves to secure the gear G upon the shaft, the wire being first passed vertically through a hole in the gear G, as at *i*. (See Fig. 1.)

The method which I have described for uniting the wire thread to its shaft may be employed in cases where the adjustment is produced from above and the vertical shaft dispensed with.

I claim—

1. In a wick-adjuster for central-draft lamps, a vertical endless adjusting-screw supported in bearings in the fount, the screw-thread terminating above the lower end of its shaft and near the lower bearing, combined with a stationary cup-shaped collar *f* around the lower end of the screw-thread, substantially as described.

2. In a wick-adjuster for central-draft lamps, the wick-adjusting screw composed of the vertical shaft *a* and the spiral wire thread *b*, a gear G on said screw-shaft at its upper end, the upper end of the wire of which the screw is formed extending vertically through a corresponding hole in the gear, with a vertical shaft C and gear F corresponding to the gear G, substantially as described.

CHARLES A. EVARTS.

Witnesses:
F. B. FAIRBANKS,
A. E. HALL.